United States Patent [19]
Huang et al.

[11] Patent Number: 5,754,902
[45] Date of Patent: May 19, 1998

[54] VIEW-FINDER OF CAMERA AVAILABLE FOR TAKING VERTICAL/HORIZONTAL IMAGES

[75] Inventors: Yeou-Fu Huang; Wen-Yuan Lee, both of Taichung Hsien, Taiwan

[73] Assignee: Sinpo Optical Co., Ltd., Wai Pu Hsiang Taichung Hsien, Taiwan

[21] Appl. No.: 677,234

[22] Filed: Jul. 9, 1996

[51] Int. Cl.[6] .................................................. G03B 13/10
[52] U.S. Cl. ............................................ 396/381; 396/382
[58] Field of Search ............................. 354/219, 222; 396/373, 378, 381, 382

[56] References Cited

U.S. PATENT DOCUMENTS 5,111,228   5/1992   Hansen ................................. 354/222

*Primary Examiner*—Safet Metjahic
*Assistant Examiner*—J. K. Han
*Attorney, Agent, or Firm*—Bacon & Thomas

[57] ABSTRACT

The present invention relates to a viewfinder of a camera for taking vertical/horizontal special effect type photos, which may use APS film for taking the known type photos as well as vertical/horizontal special effect type photos. A photo setting piece with vertical/horizontal photo sections is moved in or out of the viewfinder. The photo setting piece has a toothed rack engaging a linking gear connected to a drive gear and a control rod with a drive toothed rack. With this structure, the vertical/horizontal photo sections may enter the viewfinder subject to the need for taking wider or longer photos.

2 Claims, 6 Drawing Sheets

VIEW-FINDER OF CAMERA AVAILABLE FOR TAKING VERTICAL/HORIZONTAL IMAGES

BACKGROUND OF THE INVENTION

The present invention relates to an improvement for a camera, more particularly for a camera view-finder for taking vertical/horizontal images to permit the camera not only to take the known type of image but also for taking a wider horizontal image or a longer vertical image so as to improve the function of the camera.

It is widely known that the proportions of photos taken by a conventional camera are "fixed" and cannot give special effects to an image in the photo. For instance, when the theme of the photo is "mountain extending for a long distance", the subject of expression is the "broadness of mountain" and the sky can be actually neglected. If the theme of the photo is "a tall big tree", the subject of expression is "the height of the tree" and the areas on both sides can be neglected. The conventional camera cannot give such a special visual effect. If a photo with a special effect is desired, a "graded treatment" must be done during processing so that the photo may have a special visual effect.

SUMMARY OF THE INVENTION

It is, therefore, an object of the present invention to present a view-finder for a camera for taking vertical and horizontal images by matching APS film processing equipment. It may incorporate a setting piece with a vertical image section and a horizontal image section subject to needs of the photographer. Accordingly, the camera may take a "horizontal type photo" or a "vertical type photo" with the same visual effect as a wide TV screen to increase the effect of the image taken by the camera and to obtain special visual effects without the need for graded processing treatment.

These and other objects and advantages of the present invention will become apparent to those skilled in the art after considering the following detailed specification together with the accompanying drawings.

DETAILED DESCRIPTION OF THE PREFERRED EMBODIMENT

Figures 1A, 1B:
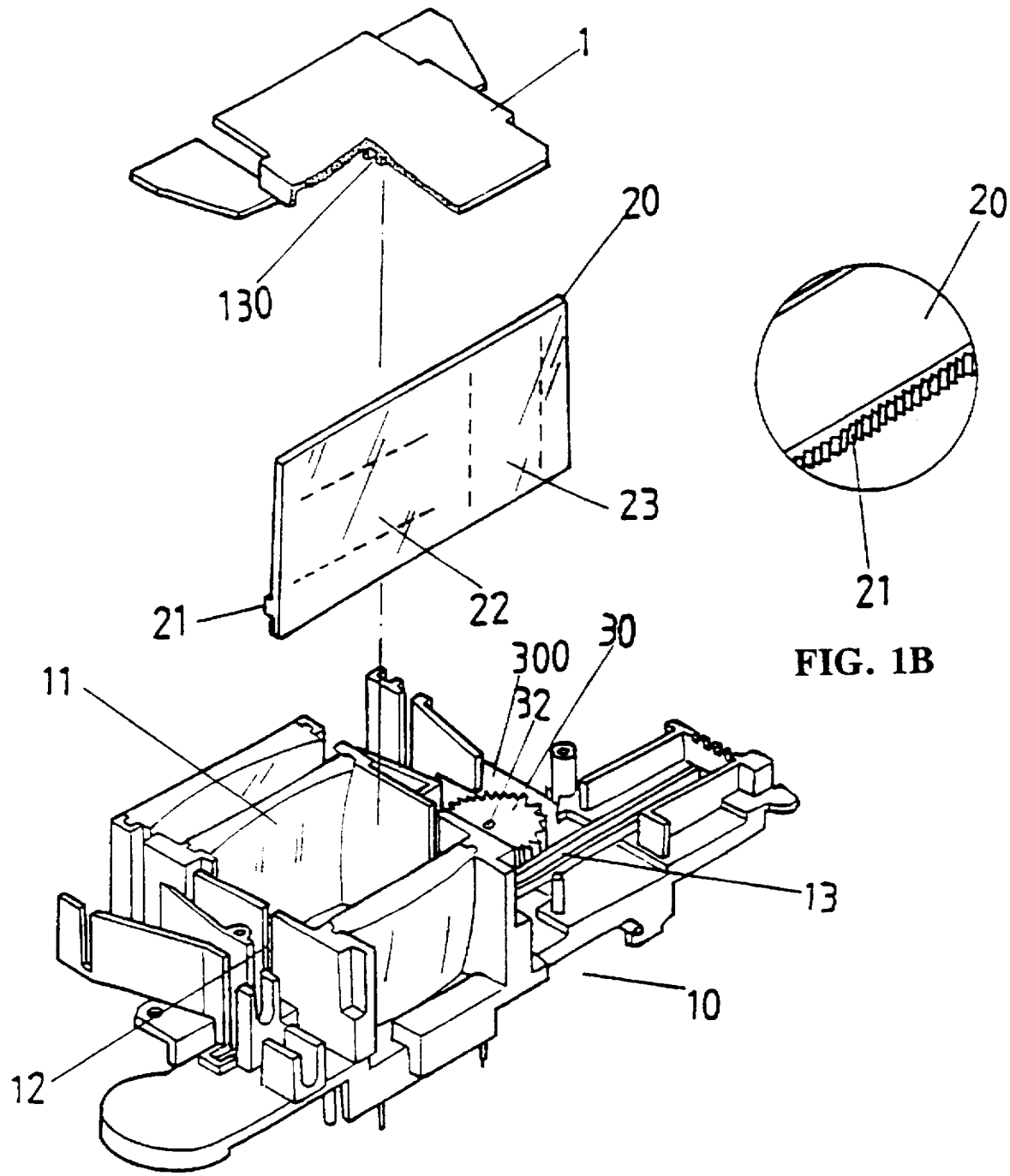
FIG. 1A is an exploded perspective view of the present invention.
FIG. 1B is a partial enlarged view of the setting piece of FIG. 1A.
Figure 2:
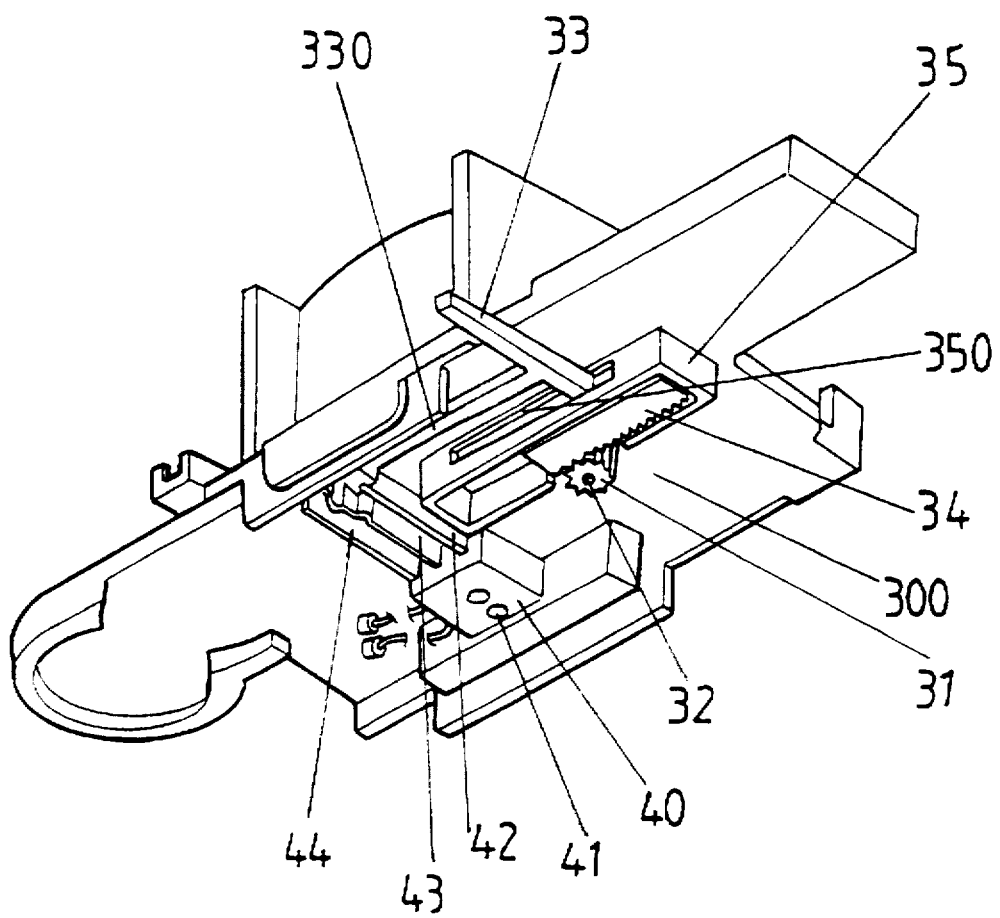
FIG. 2 is a bottom-perspective view of the present invention.
Figure 3A:
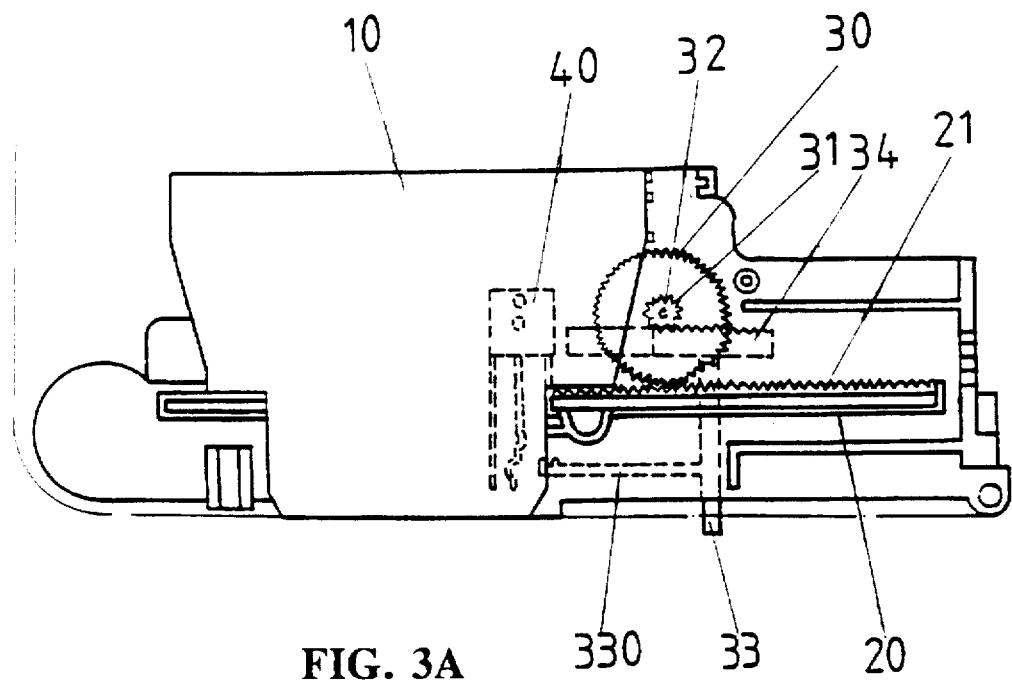
FIG. 3A and FIG. 3B are a top and front views of the present invention.
Figure 3B:
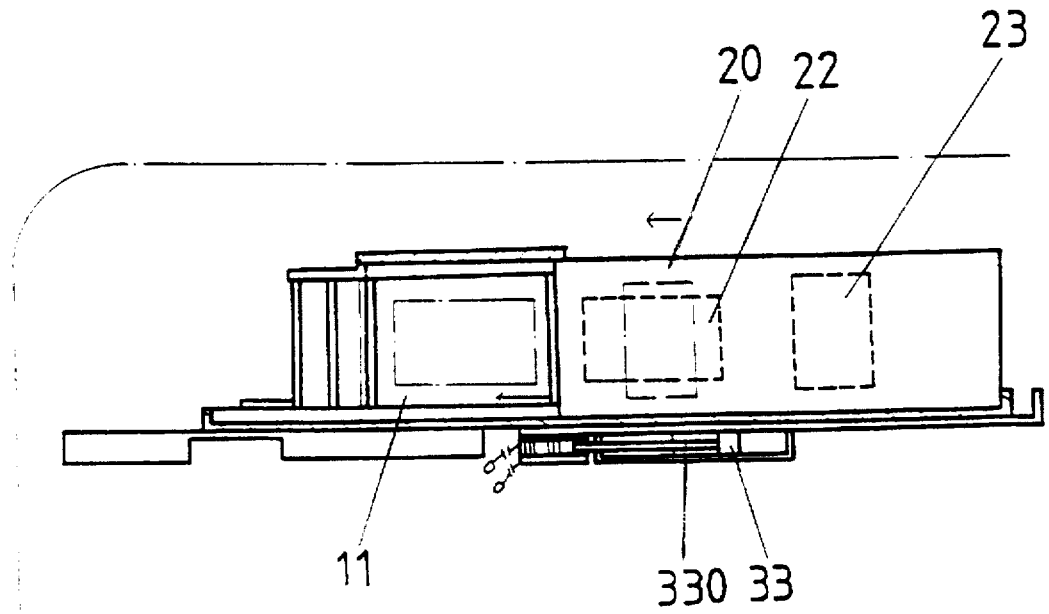

Referring to FIGS. 1, 2 and 3, the present invention comprises a main body 10, photo setting piece 20, gear mechanism 300, and status display switch 40. The viewfinder 11 of said main body 10 has a chute 12 on each side, and a rail 13 on the bottom. The top has upper cover 1 with rail 130, while the bottom has accommodating seat 35 with rail 350.

The photo setting piece 20 has a toothed rack 21, horizontal photo section 22 and a vertical photo section 23 (because of APS film, the other section outside the photo sections may be treated by processing equipment and such treatment is omitted for it is not claimed in the present invention) at appropriate zones. The photo setting piece 20 is movably mounted on the rail 13 of main body 10.

Gear mechanism 300 includes coaxial center 32 linking gear 30 and driving gear 31, respectively mounted on the top and bottom of said main body 10. The driving gear 31 on the bottom engages a driving tooth rack 34 with control rod 33. Driving tooth rack 34 and control rod 33 are mounted on the accommodating seat 35 and rail 350 of main body 10. Linking gear 30 engages the toothed rack 21 of photo setting piece 20.

Status display switch 40 has power supply sheet 42 connecting two LEDs 41, first conductor 43, and second conductor 44. Said power supply sheet 42 is connected to the push bar 330 integrally molded with the control rod 33.

Figure 4A:
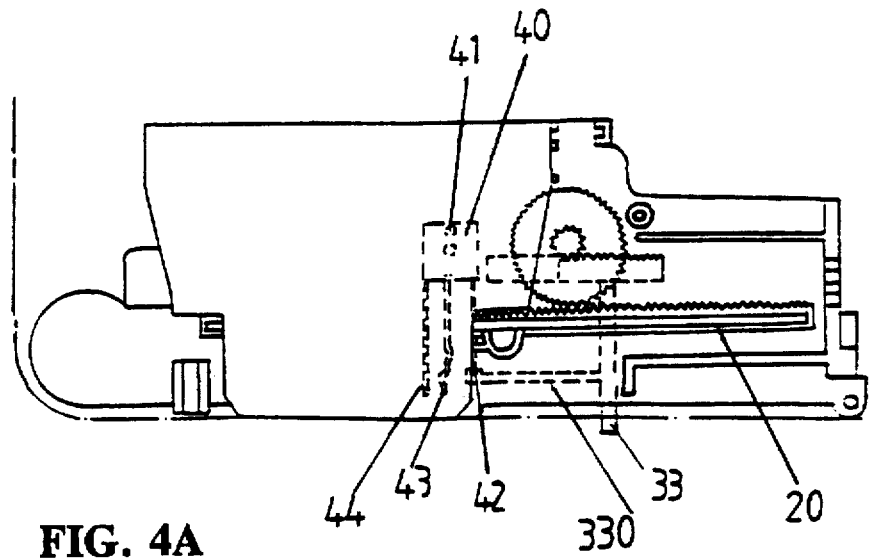
FIG. 4A, FIG. 4B and FIG. 4C are schematic views showing the present invention taking common, horizontal and vertical images.

With the aforesaid structure, the use, action and advantages of the present invention are described below:

1. Taking known type photos:

Referring to FIG. 4A, photo setting piece 20 is not moved in the viewfinder 11, i.e. the viewfinder 11 keeps its original lens to take the known type photos. The power supply sheet 42 of status display switch 40 will not be deflected and no setting will be made on APS film because no LED lamp is lit up so processing equipment will be engaged in processing known type photos.

Figure 4B:
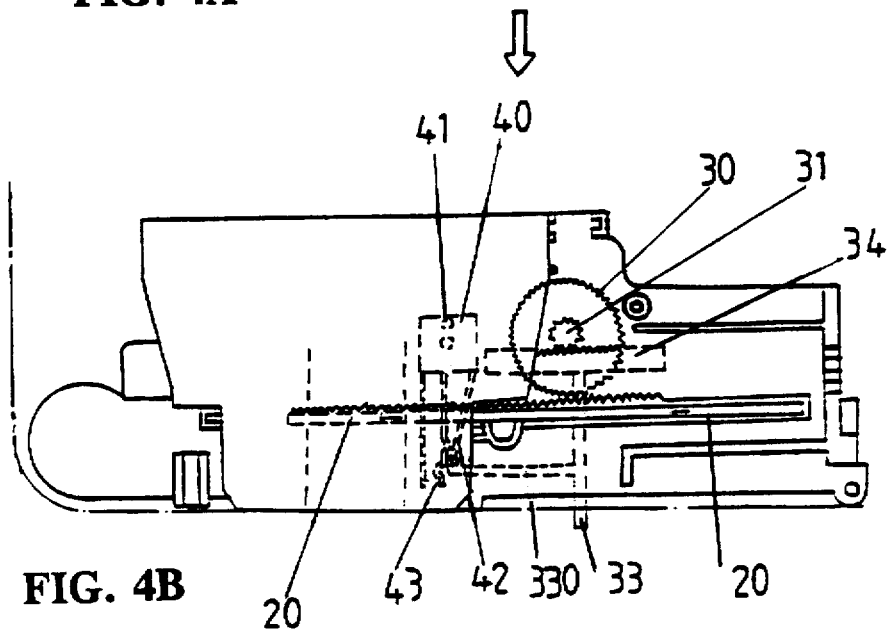

2. Taking wide (horizontal) type photos:

Referring to FIG. 4B, left movement of control rod 33 will move the toothed rack 34 and rotate the linking gear 30 to drive the toothed rack 21 on photo setting piece 20 to move the photo setting piece 20 along the rail 13 of main body 10 until horizontal photo section 22 enters the correct position in viewfinder 11. Power supply sheet 42 of status display switch 40 will be deflected to the first conductor 43 by the action of push bar 330 of control rod 33, and power supply will be powered to cause LED 41 to light up which represents a "taking horizontal type photo" status. The light of the LED may activate a sensitive setting on the corner of APS film to give a basis for processing the film by the processing equipment to process the film into horizontal photos. With the action through horizontal type photo section 22 lens when the image enters the viewfinder 11 the image taken may have a wide (horizontal) effect.

Figure 4C:
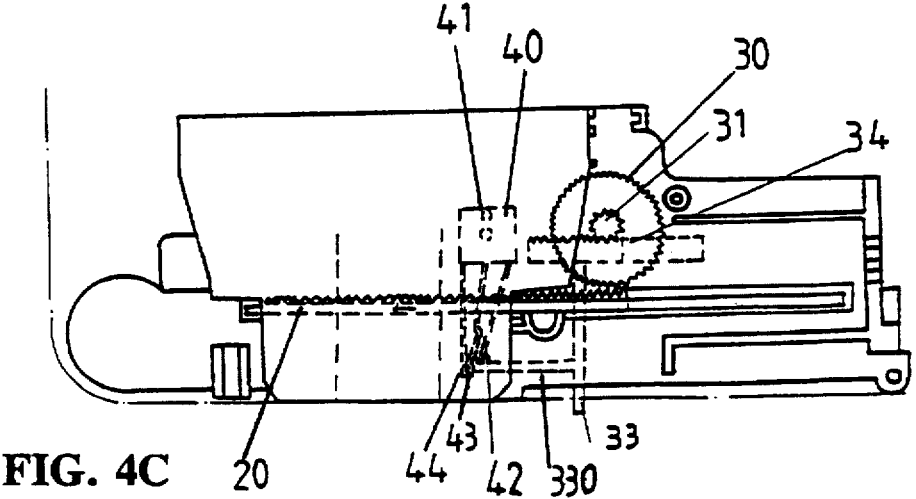

3. Taking long (vertical) type photos:

Referring to FIG. 4C, also referring to the operation of the aforesaid horizontal type photos, the photo type setting piece 20 is moved further to the left until vertical type photo section 22 enters the correct position in viewfinder 11. With the action of push bar 330 of control rod 33 power supply sheet 42, first conductor 43 and second conductor 44 will be powered, and two LEDs 41 will light up. The light of two LEDs will activate sensitive double signs on the corner of the APS film to give a basis for processing by APS film processing equipment to process the film into vertical type photos.

Figure 5:
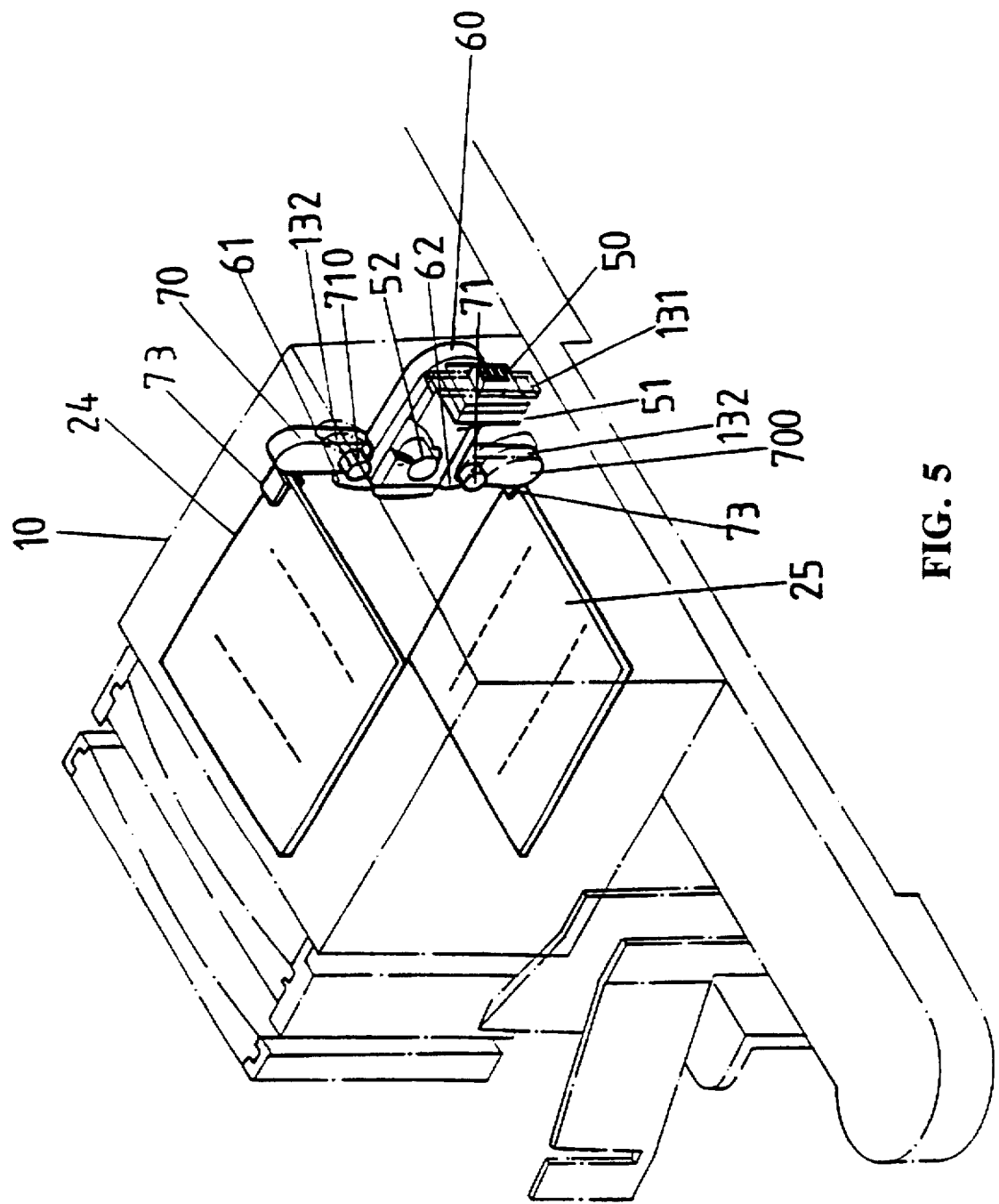
FIG. 5 is perspective-schematic view showing another embodiment of the present invention.
Figure 6A:
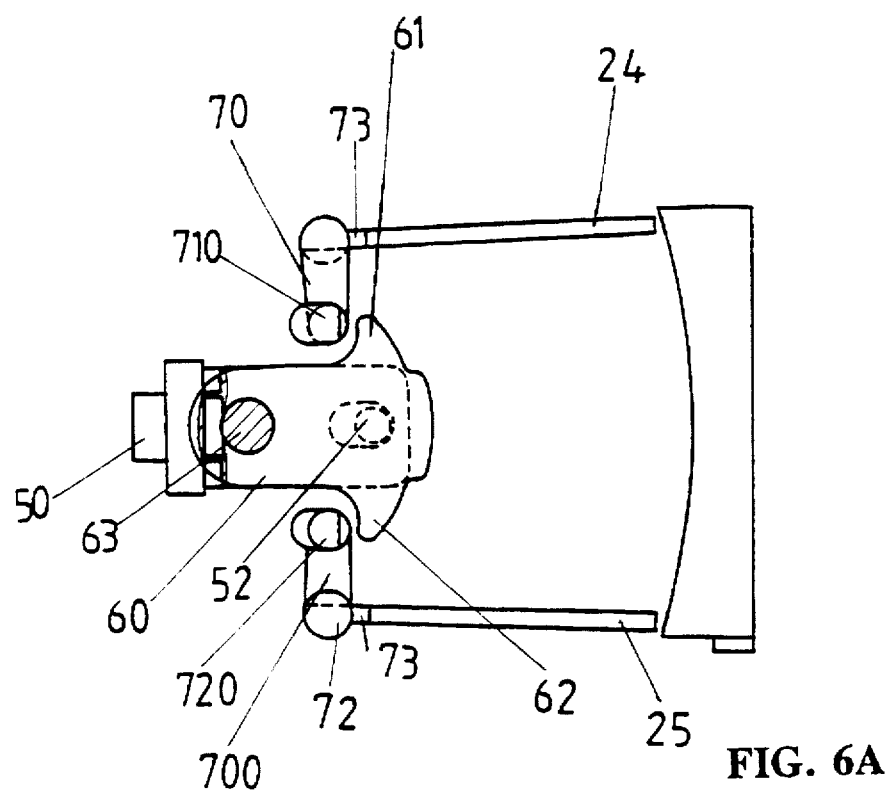
FIG. 6A and FIG. 6B are schematic views showing the operation of the embodiment of FIG. 5.
Figure 6B:
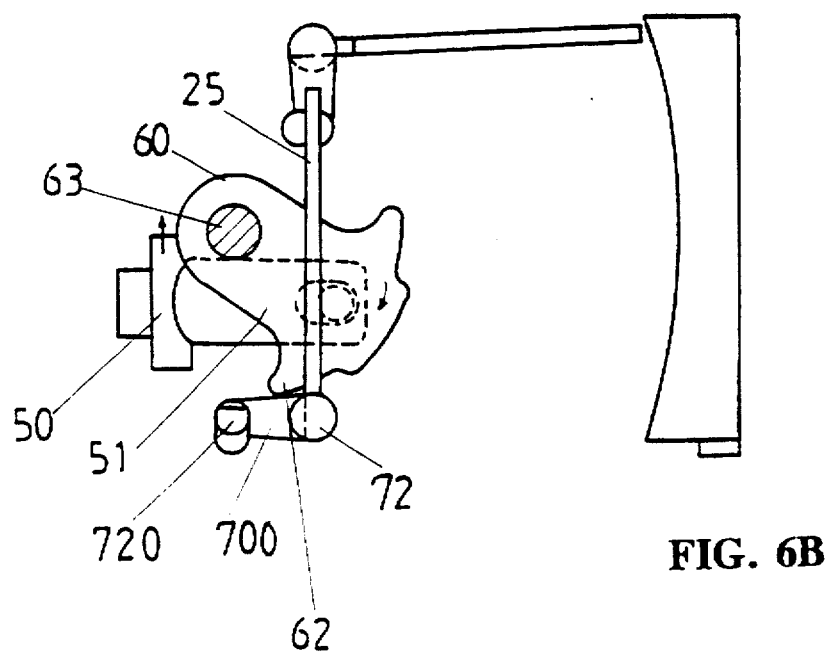

The photo setting piece of the present invention may also be comprised of a "two sheets type" as shown in FIGS. 5 and 6. Main body 10 has rail 131 and slider 132, with the rail 131 having control key 50 with driving plate 51 and projection post 52, having linking arm 62. The end of linking arm 60 has axle center 63 mounted on the main body 10 and the other end having push blocks 61, 62 for pushing two curved arms 70, 700. Said two curved arms 70, 700 also have axle centers 71, 72 and projection posts 710, 720 respectively mounted on main body 10 and slider 132. The other end of two curved arms 70, 700 has fixing seats 73 for mounting horizontal photo setting piece 24 and vertical photo setting piece 25. The action in use is follows: In FIG. 6A control key 50 is located in a central position to cause horizontal and vertical photo setting pieces 24, 25 to be inactive for taking common photos. When taking a vertical type photo, control key 50 is moved to move driving plate 51 to drive linking arm 60 downward. Push block 62 causes the curved arm 700 to move about its axis 72 to cause vertical photo setting piece 25 to raise up in the viewfinder. For taking horizontal photos the control key 50 is moved to move downward, causing horizontal photo setting piece 24 to move down in the viewfinder.

What is claimed is:

1. A viewfinder for a camera for taking standard, or vertical/horizontal special effects photos, comprising: a main body having a viewfinder, a photo setting piece, and a gear mechanism, wherein the viewfinder of said main body has a bottom rail and an upper cover with a top rail, and an accommodating seat on a bottom; said photo setting piece movably mounted in said top and bottom rails and having a first toothed rack, a horizontal photo section and a vertical photo section; said gear mechanism including a linking gear engaging the first toothed rack, driving gear fixedly connected to the linking gear and mounted on the bottom of said main body, and the driving gear on the bottom engaging a driving toothed rack having a control rod; whereby movement of the control rod moves said driving toothed rack which causes rotation of both said driving and linking gears thereby moving the photo setting piece to position one of the horizontal or vertical photo sections in the viewfinder.

2. The viewfinder as claimed in claim 1, further comprising a status display switch having a power supply sheet connected to two LEDs, a first conductor, and a second conductor, said power supply sheet connected to a push bar of the control rod such that movement of the push bar and control rod successively connects the power supply sheet, to the first conductor, to the second conductor to turn on at least one LED to indicate the position of the photo setting piece.

* * * * *